US011577734B2

(12) United States Patent
Boer

(10) Patent No.: US 11,577,734 B2
(45) Date of Patent: Feb. 14, 2023

(54) SYSTEM AND METHOD FOR ANALYSIS OF DRIVER BEHAVIOR

(71) Applicant: Nauto, Inc., Palo Alto, CA (US)

(72) Inventor: Erwin R. Boer, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 176 days.

(21) Appl. No.: 16/721,778

(22) Filed: Dec. 19, 2019

(65) Prior Publication Data
US 2020/0198645 A1 Jun. 25, 2020

Related U.S. Application Data

(60) Provisional application No. 62/782,858, filed on Dec. 20, 2018.

(51) Int. Cl.
*B60W 40/09* (2012.01)
*B60W 10/20* (2006.01)
(Continued)

(52) U.S. Cl.
CPC ............ *B60W 40/09* (2013.01); *B60W 10/04* (2013.01); *B60W 10/18* (2013.01); *B60W 10/20* (2013.01); *B60W 50/14* (2013.01); B60W 2050/0056 (2013.01); B60W 2420/40 (2013.01); B60W 2420/42 (2013.01); B60W 2420/54 (2013.01); B60W 2520/10 (2013.01); B60W 2520/105 (2013.01); B60W 2520/14 (2013.01); B60W 2540/18 (2013.01); B60W 2540/229 (2020.02);
(Continued)

(58) Field of Classification Search
CPC ...... B60W 10/04; B60W 10/18; B60W 10/20; B60W 2050/0056; B60W 2420/40; B60W 2420/42; B60W 2420/54; B60W 2520/10; B60W 2520/105; B60W 2520/14; B60W 2540/18; B60W 2540/229; B60W 2540/24; B60W 2540/30; B60W 2710/18; B60W 2710/207; B60W 2720/10; B60W 40/09; B60W 50/14; B60W 2040/0827; B60W 2050/005; B60W 40/08; B60W 40/11; B60W 40/112; B60W 40/114; B60T 2220/02; B60T 8/172; B60T 8/17551; G08B 21/06
See application file for complete search history.

(56) References Cited

U.S. PATENT DOCUMENTS 5,821,860 A * 10/1998 Yokoyama ............ G08B 21/06
340/576
9,053,516 B2 6/2015 Stempora
(Continued)

*Primary Examiner* — Babar Sarwar
(74) *Attorney, Agent, or Firm* — Vista IP Law Group, LLP

(57) ABSTRACT

The disclosed embodiments include a onboard driver distraction determination system. The determination system includes a onboard sensing and computing system(s), which includes inertial sensor(s), internal sensor(s), and external sensor(s). The onboard system samples data from the sensor (s) during a driving session to determine steering activity metrics and driver behavior. A steering activity metric is a representation of the steering inputs by the driver during the driving session. Driver behavior is a representation of how distracted the driver is during the driving session. By performing the above mentioned steps, the system can provide an analysis of driver distraction and optionally, take control of the vehicle to avoid aberrant behavior.

19 Claims, 8 Drawing Sheets

(51) Int. Cl.
*B60W 10/04* (2006.01)
*B60W 10/18* (2012.01)
*B60W 50/14* (2020.01)
*B60W 50/00* (2006.01)

(52) U.S. Cl.
CPC ..... *B60W 2540/24* (2013.01); *B60W 2540/30* (2013.01); *B60W 2710/18* (2013.01); *B60W 2710/207* (2013.01); *B60W 2720/10* (2013.01)

(56) References Cited

U.S. PATENT DOCUMENTS

| | | | |
|---|---|---|---|
| 9,663,047 | B2 | 5/2017 | Bande et al. |
| 10,610,146 | B1* | 4/2020 | Kahn ...................... H04W 4/40 |
| 10,703,268 | B2* | 7/2020 | Levkova .............. G06V 40/161 |
| 2011/0264325 | A1* | 10/2011 | McLaughlin ........ B60W 40/114 |
| | | | 701/33.4 |
| 2015/0266485 | A1 | 9/2015 | Prakah-asante et al. |
| 2016/0185388 | A1* | 6/2016 | Sim ....................... B60W 10/04 |
| | | | 701/41 |
| 2016/0267335 | A1* | 9/2016 | Hampiholi ............. B60K 28/06 |
| 2016/0267735 | A1* | 9/2016 | Hamada .............. G07C 9/00309 |
| 2017/0235306 | A1* | 8/2017 | Seki ....................... B60K 28/02 |
| | | | 701/23 |
| 2017/0313304 | A1* | 11/2017 | Shiraishi ............... B60W 30/04 |
| 2018/0126901 | A1* | 5/2018 | Levkova .............. G06V 40/161 |
| 2018/0170371 | A1* | 6/2018 | Kataoka ................ B60W 50/08 |
| 2019/0152390 | A1* | 5/2019 | Levkova .................. B60Q 9/00 |
| 2019/0265712 | A1* | 8/2019 | Satzoda ............... G08G 1/0133 |

\* cited by examiner

SYSTEM AND METHOD FOR ANALYSIS OF DRIVER BEHAVIOR

CROSS-REFERENCE TO RELATED APPLICATIONS

This application claims priority to U.S. Provisional Patent Application No. 62/782,858 filed on Dec. 20, 2018, entitled "SYSTEM AND METHOD FOR DRIVER DISTRACTION DETERMINATION," which is hereby incorporated by reference in its entirety.

TECHNICAL FIELD

The disclosed teachings relate generally to the automotive field, and more specifically to a system and method for driver distraction determination in the automotive field.

BACKGROUND

Determining the distraction level of a driver can be useful for correcting driver behavior, promoting safer vehicle operation, and quantifying the riskiness of a driver's behavior. However, quantifying driver distraction and associated risk is a complex process that can be plagued by noisy data and lack of context. For example, it can be difficult to distinguish between purposeful steering, reactive steering, road bumps, and road-induced noise in inertial data, which can make using such data to determine driver distraction and/or other driver behavior prohibitively challenging. In addition, driving activity that could correspond to distracted or unsafe driving in one context may correspond to attentive or safe driving in another context, and it can be difficult to determine the context in which driving activity is occurring. Models of risk can be used, but individual differences between users (e.g., drivers) and lack of high-fidelity environmental sensor data to accurately contextualize a given driver's behavior can limit the usefulness and general applicability of such models. Ground truth risk estimates correlated to measurable driver behavior aspects often require extensive contextual data collection (e.g., to determine suitable correlations), and likewise can suffer from limits to generalizability due to differences between individuals.

Thus, there is a need in the automotive field for a system and method for accurately determining driver distraction.

SUMMARY

The disclosed embodiments include a driver distraction determination system capable of sampling inertial measurements during a driving session, determining a steering activity metric based on the inertial measurements, and determining driver behavior based on the steering activity metric. The system can also, optionally, perform sampling of auxiliary measurements during the driving session and perform a corrective action based on the driver behavior.

The system and method function to determine whether a driver is distracted during a driving session based on inertial data. The data can be representative of the frequency of an event, severity of an event, location of an event, surrounding context of an event (e.g., the concurrent traffic parameters the concurrent vehicle interior parameters, etc.), and/or any other suitable parameter of the driver distraction event (e.g., driver distraction metric, a driver distraction parameter, etc.).

The method and system can also function to quantify behaviors and changes in behavior of individual drivers in relation to previous behavior of the same driver, a fleet of drivers (e.g., a population of mutually associated or other related drivers), the total population of drivers about which behavior information is determined, and/or any suitable combinations or subgroup thereof. Additionally, the system and method can quantify driver behavior (e.g., driver risk) on the basis of non-localized driving context and/or driving maneuver, to enable mapless comparisons between driver behaviors, wherein the geographic contexts are disparate and/or unknown.

This Summary is provided to introduce a selection of concepts in a simplified form that is further described below in the Detailed Description. This Summary is not intended to identify key features of essential features of the claimed subject matter, not is it intended to be used to limit the scope of the claimed subject matter. Other aspects of the disclosed embodiments will be apparent from the accompany Figures and Detailed Description.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Figure 1:
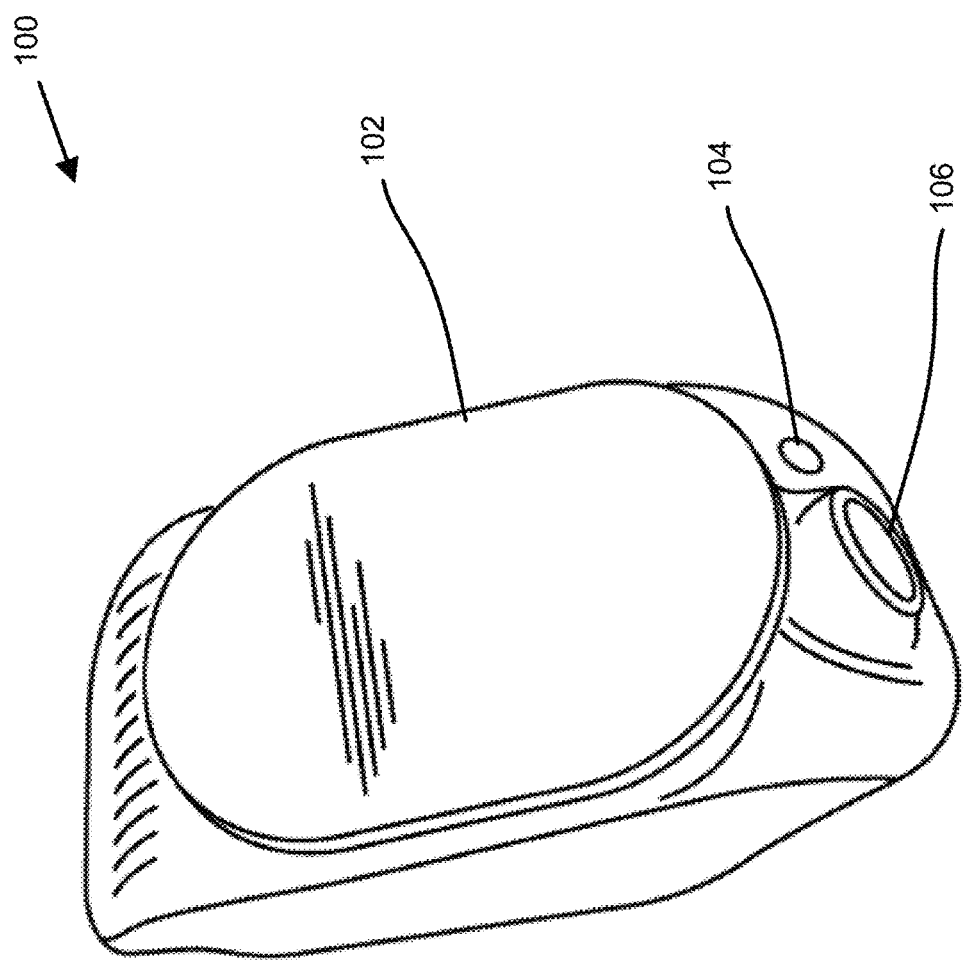
FIG. 1 is an illustration of the front side of an embodiment of the system for implementing at least a portion of the method for driver distraction determination.

FIG. 1 is an illustration of the front side of an onboard vehicle driver distraction determination system 100 for implementing at least a portion of the method for driver distraction determination. The front side of an onboard vehicle driver distraction determination system 100 includes front side 102, first front external sensor 104, and second front external sensor 106. In an embodiment, the onboard vehicle driver distraction determination system can be placed within the interior cabin of a vehicle and near the windshield, while having sensors directed towards the interior and exterior of the vehicle. For example, front side of an onboard vehicle driver distraction determination system 100 can be directed towards the interior of a vehicle. First front external sensor 104 and second front external sensor 106 can monitor the behavior of the driver, passengers, or other relevant activity within the interior cabin of a vehicle.

The onboard vehicle driver distraction determination system can optionally include a set of internal sensors and a set of external sensors (i.e., first front external sensor 104 and second front external sensor 106). Additionally, the system can include inertial sensors. For example, a set of sensors can include an accelerometer to monitor the longitudinal acceleration and/or deceleration, an accelerometer to monitor the lateral acceleration and/or deceleration of the vehicle, a gyroscope to monitor the yaw rate of the vehicle, and any other suitable sensors to monitor other suitable motion parameters of a vehicle.

Furthermore, at least some sensors can be directed towards the interior of the vehicle, while other sensors are directed towards the exterior of the vehicle. For example, first front external sensor 104 and second front external sensor 106 can be internal-facing cameras, microphones, thermal imaging cameras, speakers, etc. The exterior-facing sensors can be directed to, for example, the region in front the vehicle such as the region along the current trajectory of the vehicle, the sides of the vehicle, or any other suitable region exterior to the vehicle. The exterior-facing sensors can include, for example, cameras, laser emitters, thermal imaging camera, etc.

Figure 2:
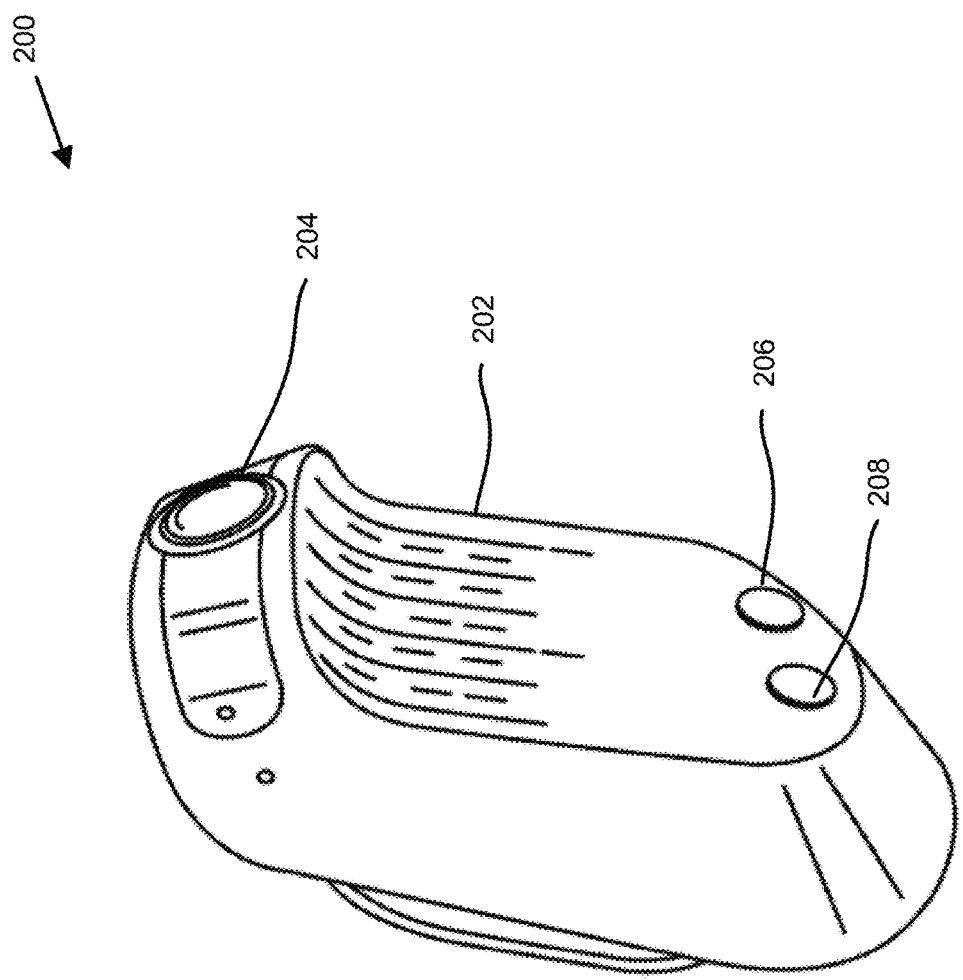
FIG. 2 is an illustration of the backside side of an embodiment of the system for implementing at least a portion of the method for driver distraction determination.

FIG. 2 is an illustration of the backside side of an embodiment of the system for implementing at least a portion of the method for driver distraction determination. The backside of an onboard vehicle driver distraction determination system 200 includes backside 202, first backside external sensor 204, second backside external sensor 206, and third backside external sensor 208. In an embodiment, the system in FIG. 2 can be placed within the interior cabin of a vehicle with backside 202 directed towards the exterior of the vehicle. For example, the system in FIG. 2 can be statically mounted by a coupling mechanism near the rear view mirror of a vehicle.

The set of sensors, first backside external sensor 204, second backside external sensor 206, and third backside external sensor 208, can be any of, for example, cameras, speakers, microphones, thermal imaging cameras, motion detectors, and any other suitable sensors. For example, first backside external sensor 204 can be a camera that monitors the activity external to the vehicle such as the movement of other cars, pedestrians, bicyclists, and other activity. Second backside external sensor 206 can be a speaker that beeps when an object is within a threshold distance. Third backside external sensor 208 can a laser emitter that tracks the distance between the vehicle and objects external to the vehicle.

Figure 3:
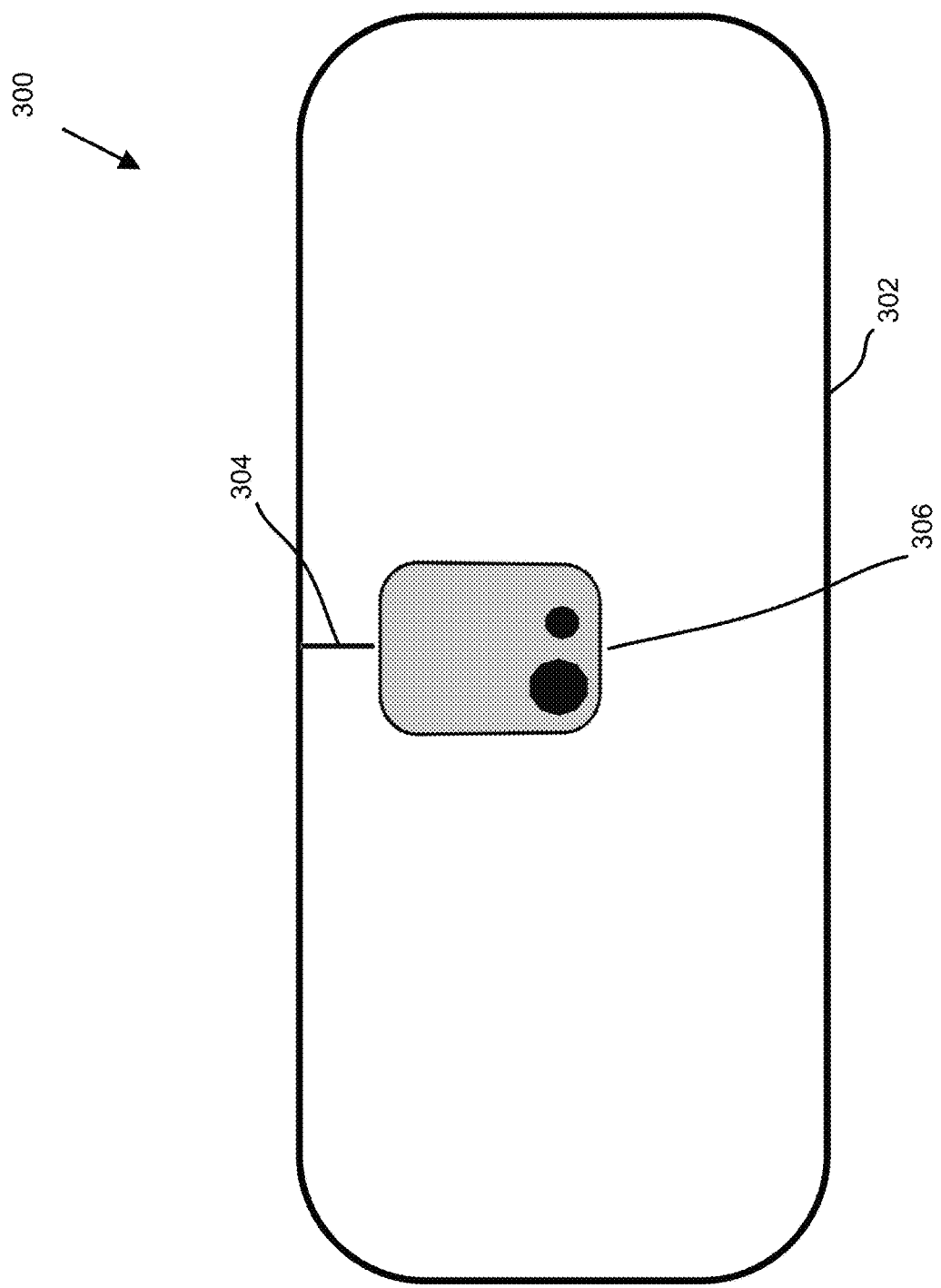
FIG. 3 is an illustration of an embodiment of the system being placed near a vehicle windshield.

FIG. 3 is an illustration of an environment with driver distraction determination system 300 including vehicle windshield 302, coupling mechanism 304, and driver distraction determination system 306. In an embodiment, driver distraction determination system 306 can be placed near the vehicle windshield 302, in between the driver and passenger (e.g., the middle of the vehicle). Furthermore, driver distraction determination system 306 can be statically and removably coupled to a vehicle part. For example, driver distraction determination system 306 can be coupled near the rear-view mirror of the vehicle, placed directly on the windshield, or placed on the dash of the vehicle. Additionally, driver distraction determination system 306 can be removed and placed in a different location based on driver preference.

The coupling mechanism 304 can include Velcro, suction cups, adhesives, magnets, clips, hinges, clamps, a fastening mechanism, or other suitable mechanisms. For example, coupling mechanism 304 can be a fastening mechanism where the driver distraction determination system 306 snaps into a slot on coupling mechanism 304. Alternatively, coupling mechanism 304 can be a magnetic system where driver distraction determination system 306 has a magnet that attracts to the magnet on coupling mechanism 304.

Furthermore, driver distraction determination system 306 can be removable. For example, a user (e.g., a driver) can initially place driver distraction determination system 306 on the vehicle windshield 302 using suction cups. However, while driving, the user may become uncomfortable with this placement due to various reasons such as glare, blind spots, etc. Thus, the user can then remove driver distraction determination system 306 from vehicle windshield 302 and place it near the rear-view mirror.

In an embodiment, a user can remove driver distraction determination system 306 from the vehicle to download the collected data onto an external device (e.g., a laptop, computer, hard drive, etc.). For example, a user may want to present evidence of positive driving behavior to an insurance provider. To do so, the user may remove driver distraction determination system 306 from the vehicle and connect driver distraction determination system 306 to a laptop. The user can then download raw data, analyzed data, visual representations of the data, or other relevant forms of data presentation. This can be done by known methods such as by Universal Serial Bus (USB), WiFi, Bluetooth, or other known communication systems.

Figure 4:
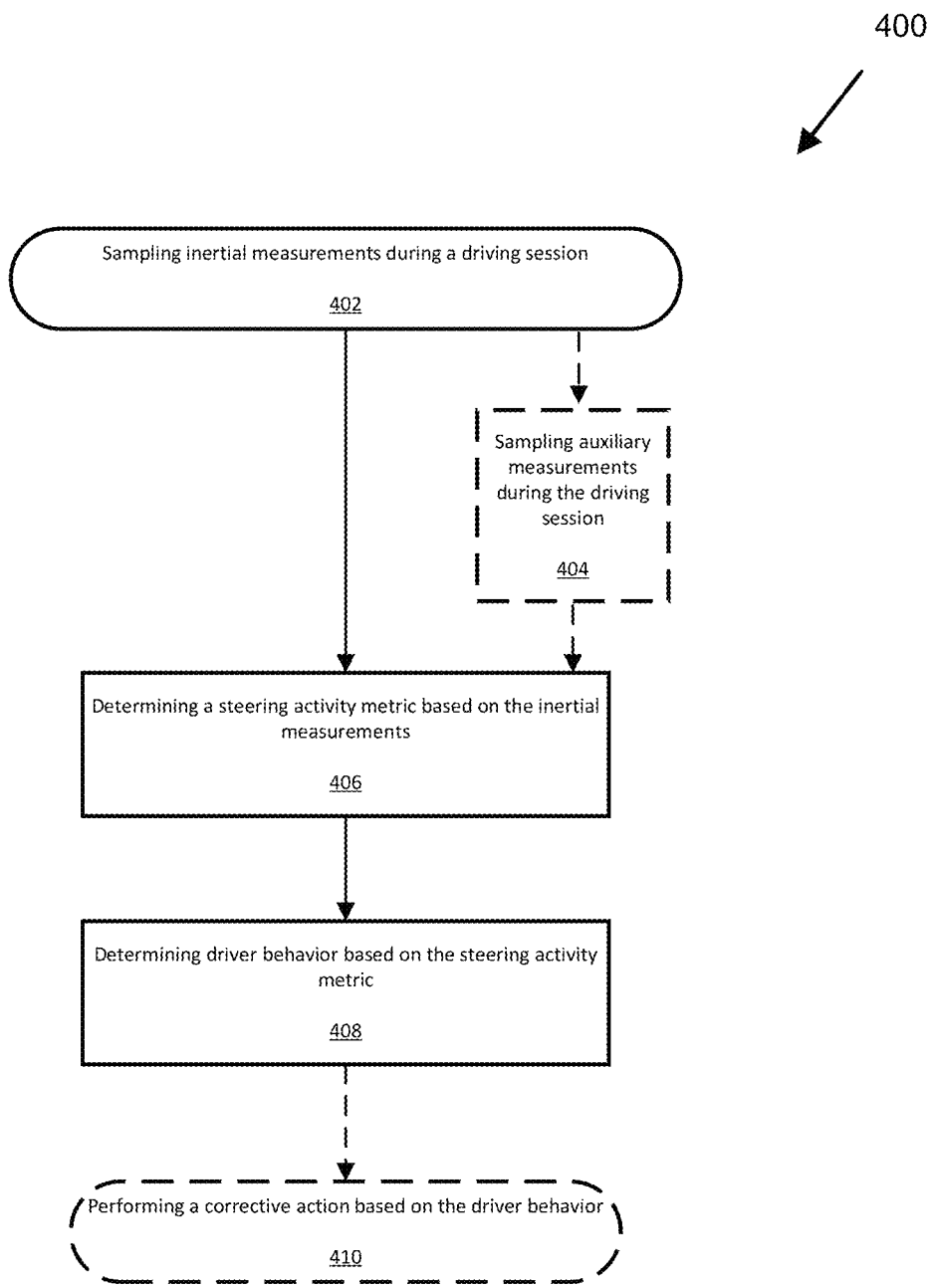
FIG. 4 is a flowchart representation of an embodiment of the method for driver distraction determination.

FIG. 4 includes a flowchart of an embodiment of the driver distraction determination system 400, which includes the steps of sampling inertial measurements during a driving session 402 ("block 402"), determining a steering activity metric based on the inertial measurements 406 ("block

406"), and determining driver behavior based on the steering activity metric 408 ("block 408"). It can also optionally include the steps of sampling auxiliary measurements during the driving session 404 ("block 404"), performing a corrective action based on the driver behavior 410 ("block 410"), and/or any other suitable methods or sub-processes.

Generally, the method shown in flowchart of an embodiment of the driver distraction determination system 400 functions to determine whether a driver is distracted during a driving session based on inertial data. In an embodiment, the method can function to determine the frequency, severity, location, surrounding context (e.g., the concurrent traffic parameters, the concurrent vehicle interior parameters, etc.), and/or any other suitable parameter of the driver distraction event. Additionally, the method can also function to quantify behaviors and changes to behaviors (e.g., risky maneuvers) of individual drivers in relation to the driving history of the same individual driver, a fleet of drivers (e.g., a population of mutually associated or otherwise related drivers), the total population of drivers about which behavior information is determined, and/or any other suitable combination or grouping. Furthermore, the method can also function to quantify driver behavior (e.g., driver risk) on the basis of non-localized or non-geography-based driving context and/or driving maneuver, to enable map-less comparisons between driver behaviors.

The method in the flowchart of an embodiment of the driver distraction determination system 400 can be implemented by and/or executed at various related systems. The method can be performed at least in part by a sensing and computing system onboard the vehicle (e.g., an onboard vehicle system), but can additionally or alternatively be performed at least in part by a remote computing system, such as a server system, a user device (e.g., a smartphone, a tablet, etc.), or by any other suitable set or network of computing systems. The method is preferably performed using data sampled by the onboard vehicle system (e.g., inertial data, vehicle sensor data, data transferred to the onboard vehicle system via a CAN-II bus or other vehicle data transfer mechanism, etc.), but can additionally or alternatively be performed using auxiliary vehicle data (e.g., signals sampled by the other vehicle sensors besides those of the onboard vehicle system, vehicle data retrieved from a database, intrinsic vehicle data associated with the vehicle itself and stored at the onboard vehicle system, etc.), other vehicles' data (e.g., received from the source vehicle, a database, or any other suitable remote computing system), aggregate population data, historic data (e.g., for the vehicle, driver, geographic location, etc.), or any other suitable data from any other suitable source. The onboard vehicle system can function to capture, record, or otherwise suitably obtain vehicle sensor data corresponding to vehicle movement during a vehicle event (e.g., a driving maneuver, a driving context, a driving incident, etc.); the onboard vehicle system can optionally function to do so while simultaneously capturing, recording, or otherwise suitably vehicle sensor data corresponding to the driver (e.g., for use in determining the driver behavior) during a vehicle event (e.g., image data, sound data, etc.). However, the onboard vehicle system can otherwise suitably capture inertial data (e.g., inertial measurements) usable to determine the driver behavior (e.g., driver steering activity, driver distraction, etc.).

The onboard vehicle system can include a processing system (e.g., a set of GPUs, CPUs, microprocessors, TPUs, vehicle computing systems, etc.), data storage system (e.g., RAM, Flash, disk drive, etc.), communication system, set of sensors (e.g., inertial sensors, auxiliary sensors, etc.), power system (e.g., battery, vehicle power connector, photovoltaic system, etc.), controller area network (CAN) bus interface (e.g., wired or wireless), housing, or any other suitable component. The communication system can include telemetry systems (e.g., for vehicle-to-vehicle, vehicle-to-infrastructure, vehicle-to-remote computing system, or other communications), wireless systems (e.g., cellular, WiFi or other 802.11x protocols, Bluetooth, RF, NFC, etc.), wired systems (e.g., Ethernet, vehicle bus connections, etc.), or any other suitable communication systems. The sensors can include: cameras (e.g., wide angle, narrow angle, or having any other suitable field of view; visible range, invisible range, IR, multispectral, hyperspectral, or sensitive along any suitable wavelength; monocular, stereoscopic, or having any suitable number of sensors or cameras; etc.), kinematic sensors (e.g., accelerometers, IMUs, gyroscopes, etc.), optical systems (e.g., ambient light sensors), acoustic systems (e.g., microphones, speakers, etc.), range-finding systems (e.g., radar, sonar, TOF systems, LIDAR systems, etc.), location systems (e.g., GPS, cellular trilateration systems, short-range localization systems, dead-reckoning systems, etc.), temperature sensors, pressure sensors, proximity sensors (e.g., range-finding systems, short-range radios, etc.), or any other suitable set of sensors.

The method can be performed (e.g., executed, implemented, etc.) in real- or near-real time, but all or portions of the method can alternatively be performed asynchronously or at any other suitable time. The method and/or portions thereof can be iteratively performed at a predetermined frequency (e.g., every millisecond, at a sampling frequency, etc.), but can alternatively be performed in response to occurrence of a trigger event (e.g., change in the vehicle attitude, change in user distraction levels, receipt of driving session information, receipt of new sensor information, physical vehicle entry into a geographic region associated with high collision risk, object proximity detection, detection of an onset or end of a driving session, etc.), be performed a single time for a driving session, be performed a single time for the vehicle, or be performed at any other suitable frequency.

Sampling inertial measurements during a driving session 402 functions to obtain direct measurements of vehicle motion while the vehicle is being operated (e.g., by a driver, by an autonomous agent, etc.). In an embodiment, sampling inertial measurements during a driving session 402 can be performed by a computing system (e.g., an onboard computing system, a remote computing system, a smartphone, etc.) in conjunction with an inertial sensor(s) (e.g., accelerometer, gyroscope, etc.). Inertial measurements can include velocity (e.g., speed and vector direction, longitudinal velocity, angular velocity or yaw rate, lateral velocity, etc.), acceleration (e.g., longitudinal acceleration, lateral acceleration, vertical acceleration, negative acceleration or deceleration in any suitable direction, etc.), jerk (e.g., acceleration rate in any suitable direction), position (e.g., absolute position, relative position, global position, position within a bounded area such as a roadway or lane, etc.), any other suitable metric defined as a time derivative (e.g., of any suitable order) of position as a function of time, and/or any other suitable measurements of inertial motion parameters.

In an embodiment, sampling inertial measurements during a driving session 402 can include determining derived inertial measurements from the sampled inertial measurements. Derived inertial measurements can include any suitable form of processed inertial measurements (e.g., time-averaged inertial measurements, time-integrated inertial measurements, the scalar or vector product of two or more inertial measurements, etc.). Determining derived inertial measurements can be performed in real-time at the onboard vehicle system but can be otherwise suitably performed with any suitable temporal characteristics using any suitable computing or processing system or component. In a specific example, determining a derived inertial measurement includes computing a yaw angle change by temporally integrating the cross product of a longitudinal velocity and lateral acceleration vector over a suitable time interval. However, derived inertial measurements can additionally or alternatively be otherwise suitably determined.

The method in flowchart of an embodiment of the driver distraction determination system 400 can optionally include sampling auxiliary measurements during the driving session 404. Sampling auxiliary measurements during the driving session 404 can function to augment the determination of metrics in accordance with one or more of the blocks in the flowchart of an embodiment of the driver distraction determination system 400. Sampling auxiliary measurements during the driving session 404 can also function to validate determination of driver behavior (e.g., driver distraction) based on inertial measurements using auxiliary data (e.g., contextual data, duplicative data obtained via alternative modality, etc.). Auxiliary measurements can include measurements from any suitable non-inertial sensors, such as image sensors (e.g., still-image cameras, video cameras, thermal cameras, hyperspectral cameras, photodiodes, photodiode arrays, CCD cameras, and/or any other suitable image sensors, etc.), auditory sensors (e.g., microphones), ambient light sensors, temperature sensors (e.g., thermometers, thermistors, thermocouples, etc.), and any other suitable sensors.

For example, sampling auxiliary measurements during the driving session 404 can include sampling interior and exterior data streams (e.g., interior and exterior video streams, using interior-facing and exterior-facing cameras of an onboard vehicle system, respectively). Interior and exterior video streams in this example can be correlated (e.g., spatially correlated, temporally correlated, etc.). In this example and related examples, Block 404 can include sampling image data and other suitable data analogously as described in U.S. application Ser. No. 16/011,437, filed 18 Jun. 2018, which is incorporated herein in its entirety by this reference.

Determining a steering activity metric based on the inertial measurements 406 includes determining a steering activity metric based on the sensor measurements (e.g., sampled in accordance with one or more variations of sampling inertial measurements during a driving session 402). Determining a steering activity metric based on the inertial measurements 406 can also function to determine whether a corrective steering action has occurred (e.g., a correction to a vehicle path made by a driver). Block 402 can be performed based on inertial measurements, auxiliary measurements, or other relevant data.

In an embodiment, steering metrics can be based on or include frequency of an event or activity during a driving session or portion of a driving session, magnitude and/or duration of corrective actions such as steering, braking, or accelerating inputs, and any other relevant data. Corrective actions can be quantified based on angular change in vehicle heading in combination with vehicle speed; thereby, mitigating false positives from noisy accelerometer data alone. Furthermore, determining a steering activity metric based on the inertial measurements 406 can include filtering inertial measurements such as raw inertial measurements or derived inertial measurements, to determine significant correction events. For example, a significant event can include a steering input that causes a rapid change in the trajectory of the vehicle or speed of the vehicle. These changes can be detected by an onboard diagnostics system, or by sensors on the driver distraction determination system (e.g., as in FIGS. 1-3). These systems can have trigger thresholds for speed, steering angle change, trajectory change, and other metrics, wherein the system only flags activity above the thresholds; thereby, not altering for regular driving activity.

In an embodiment, determining a steering activity metric based on the inertial measurements 406 can include computing the yaw angle change from the inertial measurements, as in sampling inertial measurements during a driving session block 402. For example, yaw angle can be computed from time-integrated tilt-corrected gyroscope signals from a gyroscope aligned along the principal axis in the vertical direction after tilt correction, the z-axis. Additionally, a steering metric can be based on lateral acceleration of the vehicle. For example, lateral acceleration can be directly measured by an accelerometer (a first method), or calculated by multiplying yaw rate, from a gyroscope, by the vehicle speed, from a GPS sensor providing location as a function of time (a second method). Moreover, jitter from road noise can be distinguished from purposeful steering by using filtering mechanisms or algorithms such as a low-pass filter, high-pass filters, Gaussian filters, or other methods.

In an embodiment, road noise can be filtered by using both the first and second methods for deriving lateral acceleration. For example, when a driver steers to correct a vehicle heading (e.g., performs a correction, executes purposeful steering along the vehicle path, etc.), the lateral acceleration computed via the first method and via the second method produce substantially matching output estimates (e.g., estimates of lateral acceleration). In contrast, when the driver navigates over a bump or other irregular road surface feature the vehicle does not yaw substantially, and thus, only the first method provides a meaningful output estimate (e.g., from the direct lateral acceleration measurement) resulting to deviations between the two estimates that indicate road roughness. For example, the comparison of the two computation methods can be speed dependent (e.g., due to suspension and/or inflated tires acting as a low-pass filter of the accelerometer signal power at high speed and corresponding vibrations). In another example, if the lateral acceleration computed via the first method is consistently, over a predetermined window, less than the lateral acceleration computed via the second method, the steering activity metric can correspond to a high number of corrections (e.g., higher than a median number for a driver in a similar context, a driver in a fleet of drivers, etc.). In yet another example, if the lateral acceleration computed via the first method is noisy but the lateral acceleration computed via the second method is not, then the steering activity metric can correspond to a low number of corrections and/or low levels of purposeful steering inputs (e.g., because the vehicle is bouncing or vibrating due to road noise, not as a result of purposeful steering or corrections). In further examples, the analyzed event can be considered road noise when the yaw angle is below a predetermined trigger threshold, and considered a steering action when the yaw angle is above a predetermined trigger threshold. In further examples, the analyzed event can be considered road noise when the direct measurement of linear lateral direction acceleration is close to or equal to zero. However, road noise can be otherwise distinguished from purposeful steering.

In an embodiment, the inertial measurements (e.g., inertial signals, gyroscope signals, etc.) can be filtered (e.g., low pass filtered). Filtering can function to isolate frequencies corresponding to human steering inputs (e.g., inputs having characteristic frequencies less than 5 Hz, less than 2-3 Hz, any other suitable frequency known to correspond to nominal human driving inputs and steering inputs in particular, etc.). Filtering can also function to remove fan noise (e.g., noise in inertial sensors resulting from proximity to a fan of the onboard vehicle system) and/or other noise. Filtering can include filtering using a Butterworth filter and/or any other suitable signal filter. In a specific example, inertial signals (e.g., accelerometer signals, gyroscope signals, etc.) corresponding to an x-axis, a y-axis, and a z-axis are filtered using a $5^{th}$ order Butterworth low pass filter with a 0.75 Hz cutoff frequency. However, filtering can be otherwise suitably performed using other methods.

In an embodiment, determining a steering activity metric based on the inertial measurements 406 can include using auxiliary data (e.g., video stream data, CAN bus data, other vehicle data, etc.) to assess suitability of the filter window in filtering as described above. For example, a long window can correspond to normal drift corrections, which can be validated based on a computer-vision analysis of forward-facing image data (e.g., lane line tracking). In another example, a short-to-medium window can correspond to intentional turns, which can be validated based on detected turn signal outputs (e.g., interior audio data, CAN bus data that reports a turn signal, etc.). In another example, a short window (e.g., a sudden change in the value of an inertial measurement) can correspond to a correction, which can be validated based on identifying an object (e.g., depicted in forward-facing image data) encroaching on a projected vehicle path, determining a look-away event by a driver (e.g., based on interior-facing image data), and/or otherwise suitably validated.

In an embodiment, determining a steering activity metric based on the inertial measurements 406 can include detecting a strong steering input. Detecting a strong steering input can include identifying a strong correction to the vehicle path based on the steering activity metric. Additionally, it can function to provide an input to one or more variations of determining a correction duration, the time period over which a yaw angle change is detected, and magnitude, an angular magnitude of a yaw angle change. Basing the strong steering input determination on the combination can function to distinguish a strong correction (e.g., which can correspond to a large yaw angle change over a substantial duration) from an impulsive event (e.g., a collision, which can correspond to a high magnitude over a short impact duration).

For example, detecting a strong steering input can be based on a change in yaw angle that falls within a predetermined range over a predetermined time interval, and designating that change as a strong steering input. The predetermined yaw angle range and/or predetermined time interval can be based on vehicle speed (e.g., wherein a speed of 60 mph on a highway can correspond to a lower angular change over a shorter period of time indicating a strong steering correction, and a slower speed of 25-30 mph on a surface street can correspond to a larger angular change over a longer period of time indicating a strong steering correction).

Figure 6:
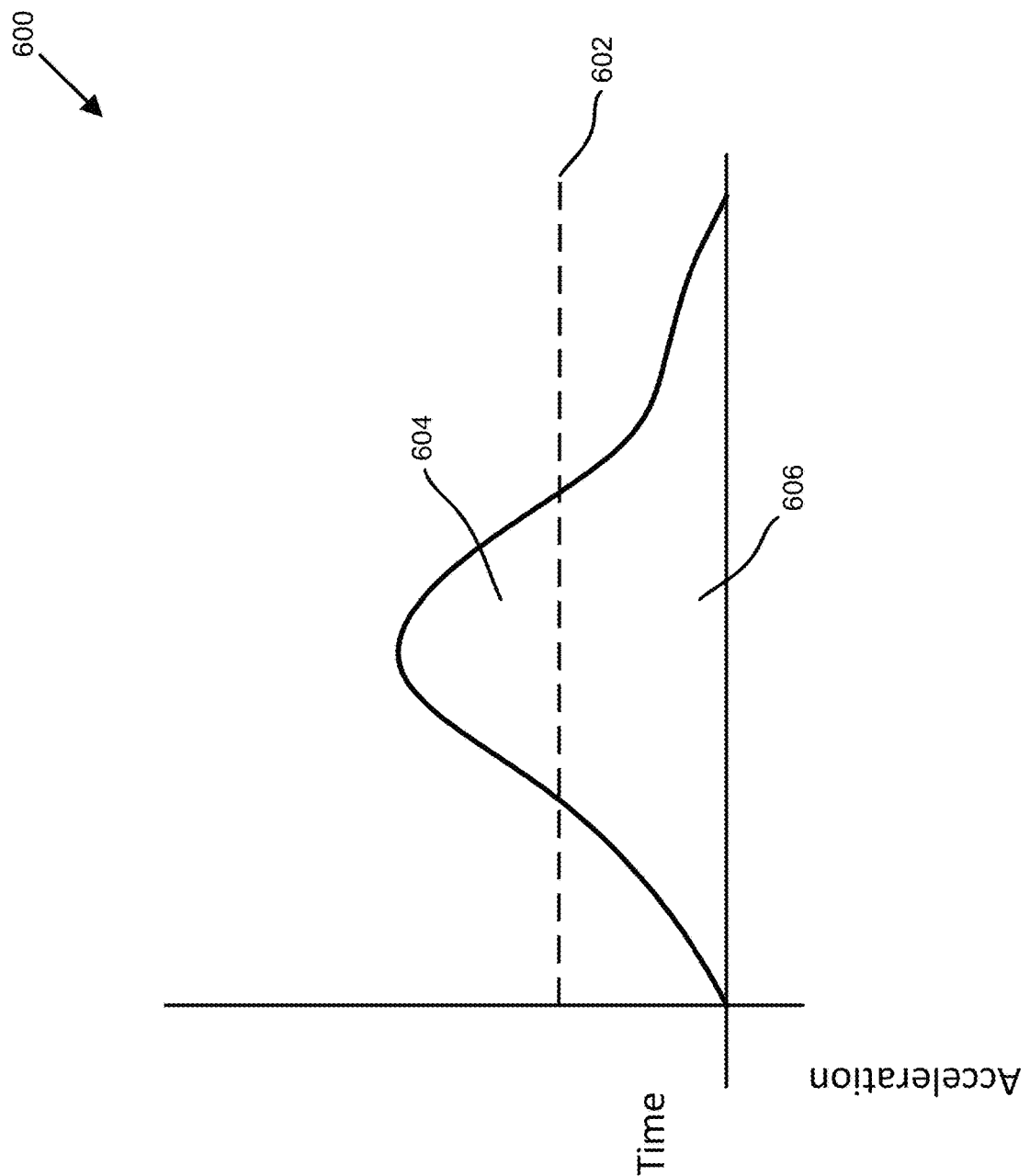
FIG. 6 is an illustration of an example acceleration vs. time curve used to determine a steering activity metric in relation to an embodiment for driver distraction determination.

In an embodiment, detecting a strong steering input can also include triggering integration of a yaw angle change above a trigger threshold, and integrating the entirety of the yaw angle change curve (e.g., including regions below the trigger threshold), as shown in FIG. 6. Triggering at a threshold level and integrating before and after the trigger level can function to reduce the number of false positives (e.g., by limiting the number of integration computations) and also provide a more accurate indication of strong steering inputs (e.g., by integrating over the entire sustained steering input event).

Figure 5:
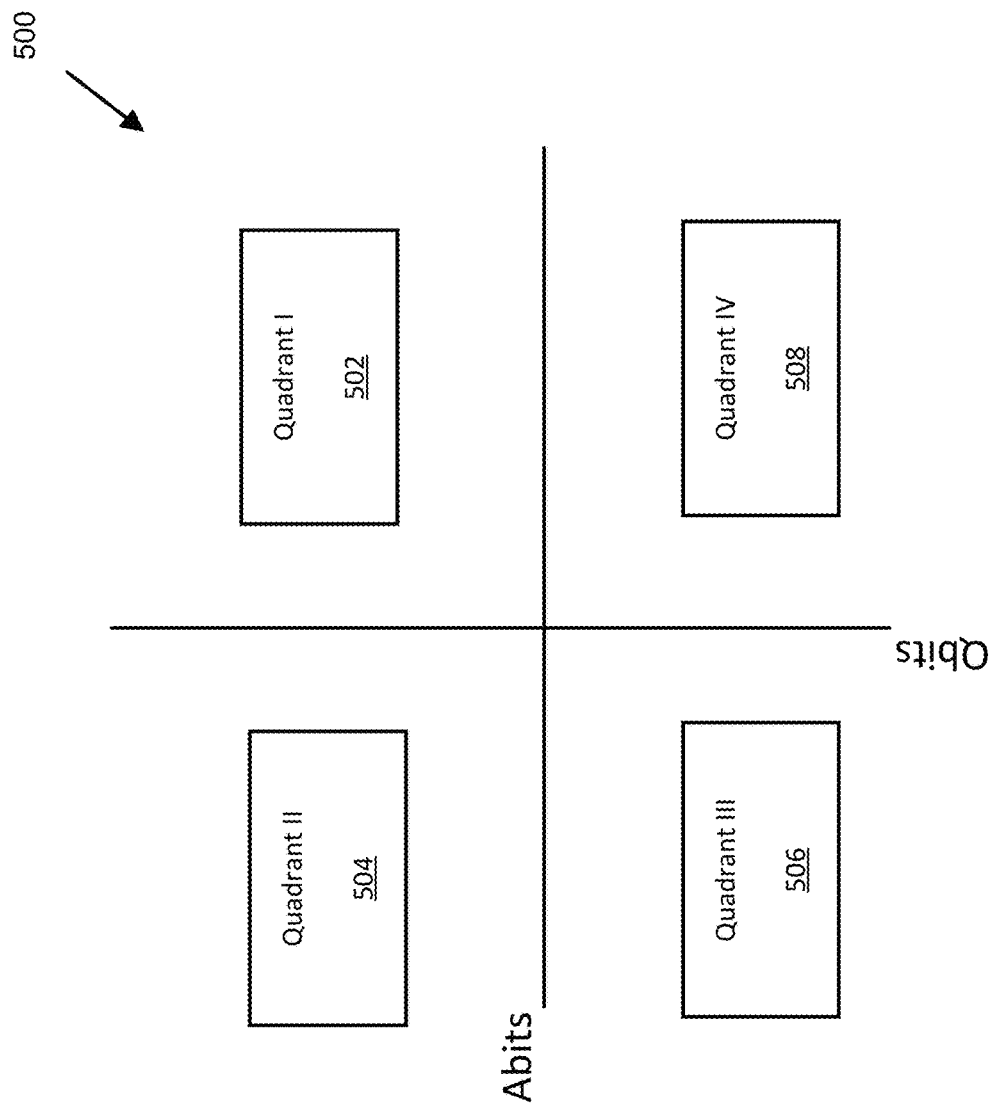
FIG. 5 is an illustration of a qualitative 2D graph for binary steering activity metrics in relation to an embodiment of the method for driver distraction determination.

In an embodiment, determining a steering activity metric based on the inertial measurements 406 can also include determining a binary steering activity metric, as further described in the description of FIG. 5. This functions to reduce multivariate inertial measurements (e.g., multi-axis time series of accelerometer and/or gyroscope values, inertial measurements augmented by auxiliary measurements, etc.) to a binary (e.g., two-valued, binary valued, etc.) metric of steering activity. The binary metric of steering activity can enable a histogram of discrete steering events (e.g., binary valued "bits" corresponding to a steering activity, thresholder steering activity, etc.) to be built up over time (e.g., during a driving session, longitudinally over a number of driving sessions, etc.). For example, determining a steering metric is performed over a discrete time window (e.g., a filtering time window that distinguishes human input time scales from sensor noise, road noise, etc.) but can additionally or alternatively be performed instantaneously at each moment in time (e.g., in real-time), periodically with any suitable period and/or frequency, and/or with any other suitable temporal characteristics.

Determining driver behavior based on the steering activity metric 408 includes determining driver behavior based on the steering activity metric (e.g., determined in accordance with one or more variations of determining a steering activity metric based on the inertial measurements 406). Driver behavior can include driver distraction, such as a driver distraction metric, or other quantitative or qualitative aspect of driver behavior. Determining driver behavior based on the steering activity metric 408 can also function to determine a measure of driver distraction during a driving session, a set of driving sessions, over a predetermined time interval, in comparison with the same or similar driving situations (e.g., speed, GPS location, yaw angle, path curvature, etc.), other relevant method. Additionally, steering activity metrics can be based on joint distributions, such as histograms, across multiple metrics, and to determine aberrant driver behavior based on the joint distributions.

In an embodiment, the measure of driver distraction can include a driver distraction score, with a range between 1 and 10, wherein 1 corresponds to a non-distracted state and 10 corresponds to a maximally distracted state. For example, the score can be based on determined distraction analysis such as a driver distraction categorization (e.g., categorization from a set of categories including highly or overly vigilant, drunk or cognitively impaired, struggling or labored driving, distracted and/or fatigued, and any other suitable category), an output of a driver distraction model (e.g., a convolutional neural network that classifies behavior as distracted or non-distracted based on inputs including inertial measurements and/or auxiliary measurements), a factor-based distraction model substantially as described in U.S. application Ser. No. 15/805,348, filed 7Nov. 2017, which is incorporated herein in its entirety by this reference, and/or any other suitable quantitative and/or qualitative measure of driver distraction. Alternatively, the measure of driver distraction can include categorizing driver distraction based on distributions of the amplitude of a steering change (Abits) and the quietness (Qbits) or the frequency of actions taken over a time period (e.g., during a driving session, over multiple driving sessions, etc.). Distributions of Abits and Qbits can be compared to determine what is or is not aberrant for a given driver (e.g., wherein certain drivers may exhibit more Abits and/or Qbits at the same level or category of distraction at which other drivers exhibit fewer Qbits and/or Abits).

In an embodiment, determining driver behavior based on the steering activity metric 408 can include classifying a driving task based on the steering activity metric. In determining driver distraction, acceleration ranges that correspond to various metrics of distraction can differ (e.g., based on speed, based on maneuver, etc.) due to particularities of vehicle dynamics, speed profile patterns that differ across speeds, and the variable risk to surrounding traffic associated with high acceleration in various contexts, all of which dynamically vary and affect what falls outside the norm of expectations and thus what constitutes aberrant driver behavior. Thus, classifying a driving task can function to sensitively and fairly quantify aberrant or risky behavior based upon situation-dependent acceleration thresholds. Situation-dependence can be assessed by segmenting source data (e.g., inertial measurements, steering metrics, etc.) by speed, road type, and/or driving maneuver (e.g., driving task). For example, classifying can be performed based on an auxiliary metric in combination with the steering activity metric (e.g., speed extracted from GPS time series, parameters of the vehicle surroundings extracted from external imagery using computer-vision techniques, etc.). Driving maneuvers classified based on the steering activity metric(s) can include: a left turn, a right turn, negotiation of a curve, stopping, accelerating from a stop, speed regulation (e.g., maintaining a constant or nearly-constant speed), car following, and any other suitable driving maneuver (e.g., as further described in the description of FIG. 5).

Figure 7:
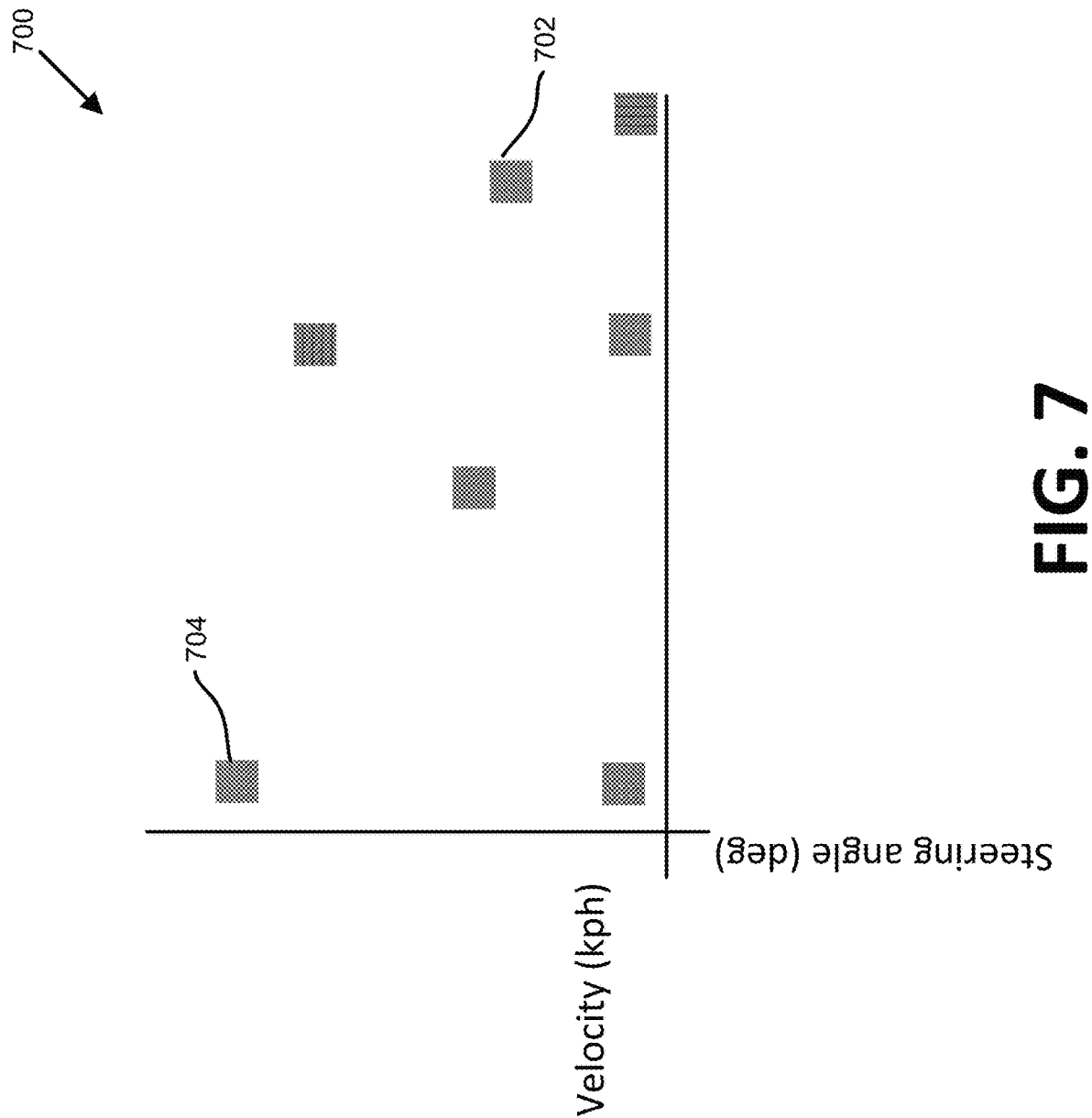
FIG. 7 is an illustration of a 2D graph of velocity vs. steering angle used to classify driving maneuvers in embodiment of the method for driver distraction determination.

In an embodiment, classifying a driving task based on the steering activity metric can include classifying driving maneuver based on speed and total steering angle change in a peak-to-peak interval (as further described in the description of FIG. 7). Additionally, classifying a driving task based on a a steering activity metric can include calculating a behavioral entropy of a driver (e.g., a metric that can be compared across drivers independently of the context associated with a driving event). In such variations, the calculated behavioral entropy can quantify the statistical deviation of a behavioral metric (e.g., a steering activity metric) from its expected value based on a probability distribution function associated with the behavioral metric.

In an embodiment, calculating an average behavioral entropy of a driver across all driving sessions associated with the driver by performing a risk-grid analysis can be performed. The risk-grid analysis includes defining a two-dimensional grid of cells (e.g., as shown by example in FIG. 7) along axes of average speed and steering angle change, wherein each cell of the grid includes a set of behavioral metric values observed at the conditions (e.g., average speed and steering angle change) associated with the cell. In an example, each cell defines a CDF of five behavioral metrics, wherein the five metrics include a maximum longitudinal acceleration, a maximum longitudinal deceleration, a maximum lateral acceleration in the positive/righthand direction, a maximum lateral acceleration in the negative/left-hand direction, and a maximum steering rate (e.g., the risk-grid analysis further includes retrieving a non-normalized continuous probability distribution function (CDF) based on the set of behavioral metric values, normalizing the CDF (e.g., across all drivers, across all speeds, across all steering angle changes, etc.), and computing the behavioral entropy of the current observation (e.g., the collected inertial measurements associated with the steering activity metrics and/or behavioral metrics, each computed over a peak to peak interval) to obtain a set of multiple CDF curves. The behavioral entropy computation includes computing the area under the CDF curve (e.g., the probability of the observation) based on the deviation from the normalized CDF. The behavioral entropy in this example is computed additively (e.g., from a sum of the probabilities that each of the five behavioral metric values deviates from the normalized CDF associated with that behavioral metric, from a logarithmic sum); however, the behavioral entropy can be otherwise suitably calculated.

In an embodiment, normalizing the CDF in the risk-grid analysis can be performed at one or more levels of normalization. For example, the CDF can be normalized to a fleet (e.g., all other drivers in the fleet of drivers), to a set of similar driving events in related vehicles with similar characteristics (e.g., determined based on a VIN prefix, based on vehicle descriptors associated with a VIN or otherwise associated with the vehicle, etc.), to the set of driving events associated with solely the driver himself or herself, or other relevant methods.

In an embodiment, the instantaneous risk associated with driver behavior (e.g., the risk at a time step) can be computed based on the calculated behavioral entropy. For example, using the formula below, the risk can be computed via a finite-difference, entropy- and speed-dependent numerical scheme wherein the risk at the $n^{th}$ time is equal to the risk at the previous ($n^{th}-1$) time multiplied by a first distance-dependent factor and added to a second distance dependent factor multiplied by the product of the entropy at the $n^{th}$ time and the square of the velocity at the $n^{th}$ time.

$$Risk_n = \frac{D - \Delta d_n}{D} Risk_{n-1} + \frac{\Delta d_n}{D} H_n V_n^2 \quad (1)$$

where: Distance Traveled in current time step n, Forgetting with "Time Constant" of D meters, Entropy, Speed (Kinetic Energy).

Moreover, determining driver behavior based on the steering activity metric 408 can include determining driver distraction based on a comparison of the steering activity metric to a speed wise-segmented phase-plane plot of lateral acceleration continuous probability distribution functions (CDFs). In this specific example, time series of lateral acceleration values and the speeds at which the vehicle was traveling at the time of the lateral acceleration measurement are converted to a phase plane plot, and superimposed on an envelope of CDFs in the phase plane coordinates (e.g., speed on the X-axis, acceleration in a given direction on the Y-axis). Points at which the phase-plane plot of the driving session fall outside the phase-plane envelope (e.g., wherein the envelope can be determined based on historical driving sessions associated with the driver, the fleet of drivers, a global population of drivers, etc.) can correspond to aberrant behaviors that are designated as such based on speed (e.g., wherein the degree to which a given lateral acceleration is or is not aberrant is based on the speed segment).

Furthermore, the determined driver distraction (e.g., the metric quantifying the driver distraction, the category of driver distraction, etc.) can based on the task being performed. For example, distraction determined in a highly visually demanding situation can correspond to a higher distraction score than a low visual demand situation. The behavioral entropy calculation described above automatically accounts for situation-specific distributions, and thus, includes determining driver behavior based on the driving task associated with the underlying steering activity.

In an embodiment, determining driver behavior based on the steering activity metric 408 can include validating a determined driver behavior based on auxiliary data. For example, correlating auxiliary data streams (e.g., an inside-outside image stream used to identify driver look-aways and lane line drift) and an inertial response stream (e.g., steering or pedal inputs, lateral or longitudinal acceleration or deceleration) to validate that the determinations of each are consistent. It can also include situationally-weighting the distraction score (e.g., risk score) based on auxiliary data. For example, in cases wherein a vehicle is determined to be navigating a straight highway section with sparse traffic and drifting (e.g., exhibiting distracted behavior), a look-down or look-away event (e.g., extracted from auxiliary measurements including interior-facing imagery) can increase the distraction score beyond that which would be computed in a relatively low-risk situation such as the straight highway with sparse traffic. Additionally, the method can include increasing the distraction score associated with a first distracted driver behavior based on the same distracted driver behavior occurring in a different driving context (e.g., different roadway type, different speed, etc.) and/or along multiple preceding portions of the route during the driving session.

In an embodiment, determining driver behavior based on the steering activity metric 408 can include weighting the distraction score based on temporal patterns. For example, if the same distracted behavior (e.g., cognitive impairment, severe correction, etc.) is observed multiple times within a time window, the corresponding risk score can be increased beyond that which would be computed had the distracted behavior occurred in isolation. In another example, a sharp curve (e.g., a steering angle change exceeding a threshold such as 60°, 90°, etc.) following a distraction event may not be determined as a correction (e.g., response) following the distraction event but rather as a distinct maneuver.

In another embodiment, block 408 can include distinguishing between an anticipated and a reactive response (e.g., anticipating the need for a control maneuver such as a controlled turn or reacting to unanticipated lane drift due to distraction). Such distinguishing can be performed based on the magnitude of the response (e.g., corrective action, responsive steering input, etc.), the duration of the response, and/or shape of the response curve (e.g., magnitude as a function of time). Additionally, block 408 can also include determining a lane correction (e.g., reactive response) based on a total yaw angle change of 1-2°, as compared to determining a controlled turn (e.g., an anticipated response) based on a total yaw angle change of 80-110°. However, distinguishing between an anticipated and reactive response can be otherwise suitably performed with any other suitable basis.

In an embodiment, the shape of the response can be parameterized, to enable situational determination of driver behavior based on the parameters of the shape. In an example, the shape is parameterized by two metrics: first, the ratio of the total area beneath the curve to the peak magnitude of the response (e.g., to quantify the amount of speed or heading change), and second, the ratio of the area on the "left side" of the response curve (e.g., the area under the curve from the baseline to the peak value) to the area on the "right side" of the response curve (e.g., the area under the curve from the peak value to the baseline), which can quantify the behavior type; however, the shape can additionally or alternatively be parameterized by any suitable metrics in further examples.

The parameterized curve shapes can be used to determine the type of driving maneuver and corresponding behavior determinations, such as: if the shape corresponds to a sustained high acceleration, the driving maneuver can be categorized as controlled negotiation of a curve without an adverse behavior determination; if the shape corresponds to a short-lived high acceleration, the driving maneuver can be categorized as a small, "startled" correction with a mild adverse behavior determination and/or false positive; if the shape corresponds to a high, short-lived acceleration immediately prior to a longer, sustained acceleration, the driving maneuver can be categorized as an entry correction (e.g., wherein the previously chosen vehicle path through a turn was inappropriate and required correction as the turn was entered) with a medium adverse behavior determination (e.g., medium risk, a distraction or risk score of 5 out of 10, etc.); if the shape corresponds to a high, short-lived acceleration that occurs during the longer, sustained acceleration, the driving maneuver can be categorized as a correction within the path (e.g., a swerve, a major correction, etc.) with a severe adverse behavior determination (e.g., high risk, a distraction or risk score of 10 out of 10, etc.). However, parameterized response curve shapes can be otherwise suitably used to determine driver behavior.

The flowchart of an embodiment of the driver distraction determination system 400 includes performing a corrective action based on the driver behavior 410. Block 410 can function to inform a driver that they are engaged in an aberrant, risky, abnormal, or other driving activity that should be corrected. Block 410 can also function to automatically control a vehicle in response to determination of undesired driver behavior (e.g., performing advanced driver assistance such as automatic steering, braking, navigating, etc.). The corrective actions can include, for example, changing steering angle, changing speed, braking, alerting the driver, or any other relevant action.

In an embodiment, performing a corrective action based on the driver behavior 410 can include generating a map (e.g., a geographic map of physical locations; a map in parameter space including parameters such as speed, acceleration, context variables, etc.; any other suitable map; etc.) of driver behavior and/or other derived data (e.g., road surface data as determined in one or more variations of Block 406). For example, Block 410 can include generating a map of road surface quality based on the determination of road surface quality (e.g., based on comparing two variations of calculating lateral acceleration). The generated map can function to enable comparison of driver behavior to past behavior (e.g., by comparing metrics of driver behavior to CDFs generated as a component of map generation), and corrective action to be taken based on the comparison (e.g., action including generating and providing warnings, logging aberrant behavior for subsequent analysis and notification, etc.). The generated map can also function to aid risk-reduced routing, risk assessment of individual drivers (e.g., in the context of past behavior, in the context of the driver fleet, etc.), identify the need for road maintenance, and other suitable tasks.

Additionally, block 410 can include detecting behavioral adaptation by the driver and responding to the behavioral adaptation. For example, Block 410 can include observing adaptation of driver behavior after two or more distraction realizations (e.g., determined by observing corrections of decreasing severity) and notifying the driver that they have proactively adapted to reduce potentially risky behavior (e.g., providing positive reinforcement).

FIG. 5 is an illustration of a qualitative 2D graph for binary steering activity metrics in relation to an embodiment of the method for driver distraction determination. The 2D graph used to determine steering activity metrics 500 includes an x-axis for Abits and a y-axis for Qbits, and four quadrants, quadrant 502, quadrant II 504, quadrant III 506, and quadrant IV 508. The 2D graph used to determine steering activity metrics 500 can help determine driver distraction as described in further detail below.

For example, determining a binary steering activity metric can include determining an amplitude bit (e.g., an Abit). The Abit can designate a correction severity above a threshold value (e.g., heading angle change, area under a yaw rate curve, etc.). In an example, a positive Abit (e.g., a 1) indicates that a severe (e.g., high amplitude, amplitude greater than the threshold value, etc.) correction has occurred; thereby the activity metric will fall within quadrant I 502 or quadrant IV 508. Alternatively, a negative Abit (e.g., a 0) indicates that a severe correction has not occurred (e.g., no correction has occurred, a mild correction has occurred, etc.); thereby the activty metric will fall within quadrant II 504 or quadrant III 506. However, the binary indication of an Abit can be analogously reversed. The threshold is preferably dynamic (e.g., based on vehicle speed) but can alternatively be static (e.g., predetermined, based on driver identity but constant with respect to a given driver, etc.). In a specific example of this variation, a positive Abit corresponds to a change in yaw angle greater than 0.1 degree over a continuous correction (e.g., wherein the time window over which the yaw angle change is dynamically adjustable to include a continuous steering action without direction reversal), whereas a negative Abit corresponds to any change in yaw angle less than 0.1 degree or a change in yaw angle above a threshold corresponding to a controlled turn (e.g., about 90° for a turn at a four-way intersection). The output of this variation can include a histogram (e.g., over time) of severe corrections (e.g., during a driving session, over a set of driving sessions corresponding to the driver, etc.).

In another example, determining a binary steering activity metric can include determining a quiet bit (e.g., a Qbit). The Qbit can designate whether a correction has occurred at all (e.g., the occurrence or absence of a quiescent, non-corrective period of steering inputs). In an example, a positive Qbit corresponds to a correction and a negative Qbit corresponds to an absence of a correction; however, the binary output of a Qbit can alternatively be analogously reversed. In determining the value of a Qbit over a given time period or at a given time, a correction is preferably first determined (e.g., based on matching two estimates of lateral acceleration as described above) and the value of the Qbit assigned based on whether a correction occurred (e.g., a Qbit of 1) or did not occur (e.g., a Qbit of 0). However, determining the value of a Qbit can alternatively be performed without first determining that a correction has occurred (e.g., a Qbit value of 0 can be determined in the absence of a correction over the given time period or at the given time). The output of this variation can include a histogram (e.g., over time) of the number of corrections made by a driver (e.g., during a driving session, over a set of driving sessions corresponding to the driver, etc.).

In an embodiment, determining a binary steering activity can also include determining multiple binary steering activity metrics, wherein each binary-valued metric can be independently determined for each inertial measurement. An inertial measurement can include each acceleration axis, each principal inertial axis for which motion measurements are made, etc. In such cases, a given time can correspond to a value of any one and/or all of the metric values such as, a specific time can correspond to an Abit of 1 or 0 (e.g., a binary state of correction above a threshold severity) and a Qbit of 1 or 0 (e.g., a binary state of correction or non-correction), and any other suitable binary metric at the given time. For example, a driver can simultaneously be in a positive Qbit and positive Abit state (quadrant I 502), a positive Qbit and a negative Abit (quadrant II 504), or a negative Qbit and a negative Abit (quadrant III 506).

The binary activity metric can describe various temporal extents. In a first variation, the binary activity metric is defined at an instantaneous point in time. In a second variation, the binary activity metric is defined over a time interval (e.g., a second, 30 seconds, a minute, 5 minutes, any suitable time interval, etc.). In other variations, the binary activity metric can be determined at any suitable frequency or interval.

In an embodiment, categorizing is performed based on a 2D graph used to determine steering activity metrics 500 in which driver behavior falls (e.g., at a moment in time, within a driving session over a time window, over a single driving session, over multiple driving sessions, etc.). In an example, the low Abit and low Qbit quadrant, quadrant III 506, corresponds to a highly vigilant (e.g., novice) driver, and can be characterized by small tolerance for deviation (e.g., from a straight-line path or any other suitable vehicle path) prior to correction (e.g., high attentiveness) and/or frequent, smooth, small control actions (e.g., steering inputs). In another example, the low Abit and high Qbit quadrant, quadrant II 504, corresponds to a cognitively impaired driver, and can be characterized by large tolerances for deviation, continuous and slow control actions (e.g., weaving, looping swerves, etc.), exhibiting low consequences of lane departure (e.g., delayed corrections), and/or intermittent, smooth, small control actions (e.g., steering inputs). In another example, the high Abit and low Qbit quadrant, quadrant IV 508, corresponds to a struggling or laboring driver (e.g., negotiating difficult environments, city driving, etc.), and can be characterized by frequent, large corrective actions (e.g., sharp swerves, sudden stops, etc.) which can be caused by external disturbances (e.g., being cut off by another vehicle, sudden emergence of a vehicle or object from a side street, etc.), and/or the absence of long quiescent periods (e.g., low numbers of Qbits) due to comparatively greater consequences of drift. In yet another example, the high Abit and high Qbit quadrant, quadrant I 502, corresponds to a distracted and/or fatigued driver, and can be characterized by intermittent, large corrective actions (e.g., periods of reduced attention to the road followed by corrective action, periods of reduced engagement with path following, etc.). In this example and related examples, the driver behavior can be categorized by: a four-variable (e.g., one for each quadrant) vector that weights each variable based on the distance from the threshold that separates low and high Abits and Qbits (e.g., the central axes of the two-variable histogram), a single quadrant of the histogram, and/or any other suitable basis for categorization.

By applying variations of 2D graph used to determine steering activity metrics 500 described above, the output can include a binary activity metric value based on Abit(s) and/or Qbit(s) describing the binary state of the inertial measurements at a point in time or over a suitable time interval as described above. The output can additionally or alternatively include a 2D graph used to determine steering activity metrics 500 of each binary activity metric over any suitable time period.

FIG. 6 is an illustration of an example acceleration vs. time curve used to determine a steering activity metric in relation to an embodiment for driver distraction determination. FIG. 6 includes trigger threshold 602, integration area above trigger threshold 604, and integration area below trigger threshold 606. As described above, in conjunction with FIG. 4, the driver distraction determination system may have a predetermined trigger threshold 602, wherein the system acts if the driving maneuver has metrics in the integration area above trigger threshold 604. Conversely, the system may merely monitor or ignore a driving maneuver if it fall into the integration area below trigger threshold 606.

For example, in an acceleration vs. time graph, as in FIG. 6, acceleration within a small time interval will trigger the system. However, acceleration over a long time period or interval will likely not trigger the system. Furthermore, other metrics can be used instead of acceleration and time. For example, a trigger threshold can apply to steering angles, velocity, frequency of driving maneuvers, etc.

FIG. 7 is an illustration of a 2D graph of velocity vs. steering angle used to classify driving maneuvers in an embodiment of the method for driver distraction determination. FIG. 7 includes steering angle vs. velocity graph 700, which includes exemplary data: low velocity and high steering angle data point 702 and high velocity and low steering angle data point 704. A histogram of speed and angle change can be used to classify driving maneuver as navigating dense traffic in a city environment (e.g., corresponding to low speed, low angular change), turning at an intersection (e.g., low velocity and high steering angle data point 702), negotiating a curve in a city environment (e.g., corresponding to moderate speed, moderate angular change), negotiating a curve on a country (e.g., rural, exurban, etc.) road (e.g., corresponding to a medium-high speed and moderate angular change), traveling straight on an arterial road (e.g., corresponding to medium-high speed and low angular change), traveling straight on highway (e.g., high velocity and low steering angle data point 704), executing lane changes on a highway (e.g., corresponding to high speed and medium-low angular change), or other suitable classifications.

Figure 8:
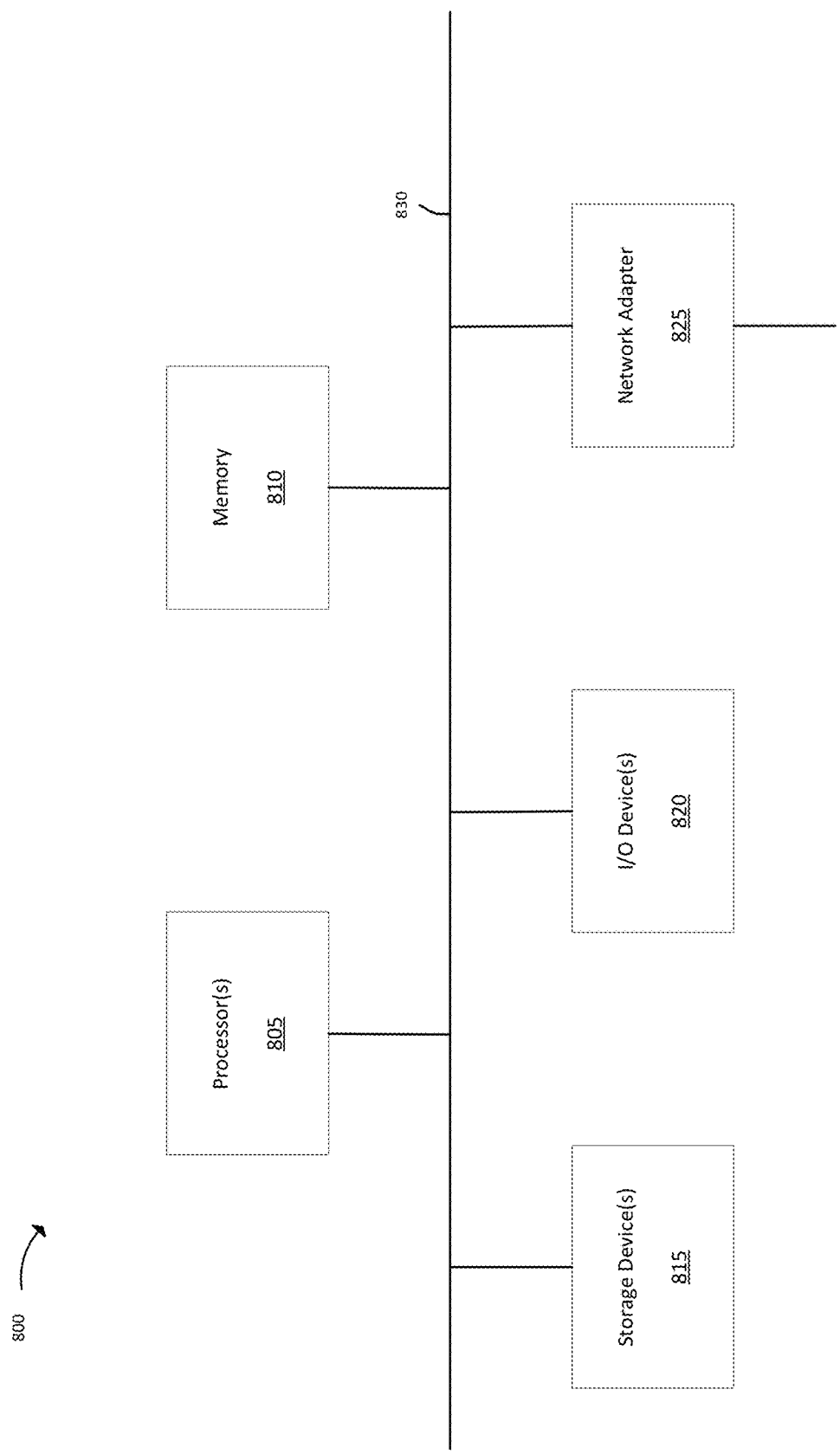
FIG. 8 illustrates a diagrammatic representation of a machine in the example form of a computer system within which a set of instructions for causing the machine to perform one or more of the methodologies discussed here may be executed.

FIG. 8 is a block diagram of a computer system as may be used to implement certain features of some of the embodiments described herein. The computer system may be a server compute, a client computer, a person computer (PC), a user device, a tablet PC, a laptop computer, a personal digital assistant (PDA), a cellular telephone, an iPad, a Blackberry, a processor, a telephone, a web appliance, a network router, switch or bridge, a console, a hand-held console, a (hand-held) gaming device, a music player, any portable mobile, hand-held device, wearable device, or any machine capable or executing a set of instructions (sequential or otherwise) that specify actions to be taken by that machine.

The computing system 800 may include one or more central processing units ("processors") 805, memory 810, input/output devices 820 (e.g., keyboard and pointing devices, touch devices, display devices), storage devices 815 (e.g., disk drives), and network adapters 825 (e.g., network interfaces) that are connected to an interconnect 830. The interconnect 830 is illustrated as an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called "Firewire".

The memory 810 and storage devices 815 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non-transitory, media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 825).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method for determining a distraction state of a driver while the driver is operating a vehicle, the method comprising:
    sampling inertial measurements during a driving session, wherein the inertial measurements are measured at least in part by an onboard sensing and computing system, and wherein the onboard sensing and computing system comprises inertial sensors;
    determining a steering activity metric based on the inertial measurements;
    determining the driver as being in the distraction state based on the steering activity metric; and
    calculating a driver distraction metric that is associated with the distraction state;
    wherein the act of determining the driver as being in the distraction state comprises classifying a driving maneuver based on the steering activity metric and a speed associated with the vehicle, and wherein the driving maneuver is classified as: a left turn, a right turn, a negotiation of a curve, a stopping, an acceleration from a stop, a speed regulation, or a car-following.

2. The computer-implemented method of claim 1, wherein the act of sampling the inertial measurements during the driving session is performed iteratively at a predetermined frequency.

3. The computer-implemented method of claim 1, wherein the act of sampling the inertial measurements during the driving session comprises taking measurements indicative of velocity, acceleration, jerk, position, yaw rate, steering angle changes, or any combination thereof.

4. The computer-implemented method of claim 1, wherein the act of determining the steering activity metric further comprises:
    filtering the inertial measurements based on a threshold value, wherein the threshold value is predetermined; and
    isolating frequencies corresponding to human steering inputs.

5. The computer-implemented method of claim 4, wherein said isolating comprises applying a low-pass filter to data representative of the inertial measurements.

6. The computer-implemented method of claim 1, wherein the act of determining the driver as being in the distracted state based on the steering activity metric comprises: computing a numeric driver distraction score between a first value and a second value, wherein the first value corresponds to a non-distracted state, and the second value corresponds to a maximally distracted state.

7. The computer-implemented method of claim 1, wherein the act of determining the driver as being in the distracted state based on the steering activity metric comprises: categorizing driver distraction events based on predetermined categories, wherein the predetermined categories comprise highly vigilant, drunk, fatigued, distracted, or any combination thereof.

8. The computer-implemented method of claim 1, wherein the act of determining the driver as being in the distracted state based on the steering activity metric comprises: categorizing driver distraction based on distributions of amplitude bits and quietness bits, wherein the amplitude bits are representative of a corrective action severity, and wherein the quietness bits are representative of whether a corrective action has occurred.

9. The computer-implemented method of claim 1, wherein the act of detecting the particular type of steering input comprises detecting a corrective steering input.

10. A driver distraction determination system comprising:
    an onboard sensing and computing system capable of at least partially sampling inertial measurements during a driving session, wherein the onboard sensing and computing system comprises inertial sensors;
    a processor configured to:
        determine a steering activity metric based on the inertial measurements;
        determining a driver of a vehicle as being in a distracted state based on the steering activity metric; and
        calculating a driver distraction metric that is associated with the distracted state;
    wherein the processor is configured to determine the driver as being in the distraction state by classifying a driving maneuver based on the steering activity metric and a speed associated with the vehicle, and wherein the processor is configured to classify the driving maneuver as: a left turn, a right turn, a negotiation of a curve, a stopping, an acceleration from a stop, a speed regulation, or a car-following.

11. The driver distraction determination system of claim 10, wherein the internal sensors comprise an internal-facing camera, a microphone, a thermal imaging camera, a speaker, or any combination thereof.

12. The driver distraction determination system of claim 10, wherein the onboard sensing and computing system further comprises a set of internal sensors and a set of external sensors.

13. The driver distraction determination system of claim 10, wherein the inertial sensors comprise an accelerometer, a gyroscope, or any combination thereof.

14. The driver distraction determination system of claim 10, wherein the onboard sensing and computing system comprises the processor.

15. A computer-implemented method for determining a distraction state of a driver while the driver is operating a vehicle, the method comprising:
    sampling inertial measurements during a driving session, wherein the inertial measurements are measured at least in part by an onboard sensing and computing system, and wherein the onboard sensing and computing system includes inertial sensors;

sampling auxiliary measurements during the driving session, wherein the auxiliary measurements are measured at least in part by non-inertial sensors;
determining a steering activity metric based on the inertial measurements;
determining the driver as being in the distraction state based on the steering activity metric and the auxiliary measurements; and
determining a driver distraction metric that is associated with the distraction state;
wherein driver distraction metric is determined based on the auxiliary measurements.

16. The computer-implemented method of claim 15, wherein the non-inertial sensors comprise an image sensor, an auditory sensor, an ambient light sensor, a temperature sensor, or any combination thereof.

17. The computer-implemented method of claim 15, wherein the act of sampling the auxiliary measurements during the driving session comprises: sampling video data representative of an interior of the vehicle and an exterior environment of the vehicle.

18. The computer-implemented method of claim 15, further comprising performing a corrective action, wherein the act of performing the corrective action comprises: generating a map based on any of location, speed, acceleration, road conditions, previous driving history, or any combination thereof.

19. The computer-implemented method of claim 15, further comprising performing a corrective action, wherein the act of performing the corrective action comprises: controlling the vehicle to perform the corrective action, wherein the corrective action comprises any of changing steering angle, changing speed, braking, alerting the driver, or any combination thereof.

* * * * *